United States Patent
Bahena et al.

(10) Patent No.: US 12,337,910 B2
(45) Date of Patent: Jun. 24, 2025

(54) METHODS AND APPARATUS TO CORRECT FOR STEERING WHEEL ROTATION

(71) Applicant: Ford Global Technologies, LLC, Dearborn, MI (US)

(72) Inventors: Miguel A. Bahena, Ann Arbor, MI (US); Andrew Brow, Northville, MI (US); Rachel Dockstader, South Lyon, MI (US); Michael Puleri, Bloomfield Hills, MI (US); William James Bouse, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 585 days.

(21) Appl. No.: 17/379,709

(22) Filed: Jul. 19, 2021

(65) Prior Publication Data
US 2023/0014442 A1   Jan. 19, 2023

(51) Int. Cl.
*B62D 6/00* (2006.01)
*B62D 5/00* (2006.01)
*B62D 5/04* (2006.01)

(52) U.S. Cl.
CPC ............ *B62D 6/008* (2013.01); *B62D 5/006* (2013.01); *B62D 5/0481* (2013.01)

(58) Field of Classification Search
None
See application file for complete search history.

(56) References Cited

U.S. PATENT DOCUMENTS

| | | | |
|---|---|---|---|
| 9,434,415 B2 | 9/2016 | Lavoie | |
| 10,577,009 B2 | 3/2020 | Lubischer et al. | |
| 2006/0237959 A1* | 10/2006 | Dimig | B60R 25/08 |
| | | | 280/776 |
| 2016/0368522 A1* | 12/2016 | Lubischer | B62D 1/105 |
| 2018/0086341 A1* | 3/2018 | Taniguchi | B62D 6/008 |
| 2019/0202496 A1* | 7/2019 | Menjak | B62D 15/0285 |
| 2019/0337566 A1 | 11/2019 | Weidig | |
| 2020/0017123 A1* | 1/2020 | Aizawa | B60W 60/0051 |
| 2020/0094873 A1* | 3/2020 | Hong | B62D 6/008 |
| 2020/0361530 A1 | 11/2020 | Polmans et al. | |
| 2022/0227416 A1* | 7/2022 | Suzuki | B62D 15/025 |

FOREIGN PATENT DOCUMENTS

| | | |
|---|---|---|
| DE | 102009000244 | 7/2010 |
| JP | 2019188992 A | 10/2019 |

* cited by examiner

*Primary Examiner* — Adam D Tissot
*Assistant Examiner* — Laura E Linhardt
(74) *Attorney, Agent, or Firm* — Lorne Forsythe; Hanley, Flight & Zimmerman, LLC

(57) ABSTRACT

Methods, apparatus, systems and articles of manufacture are disclosed a vehicle comprising a steering assist system, a steering wheel, a user interface, and a steering controller to detect, via the user interface, a request to move the steering wheel of a vehicle to a first rotational position, the steering wheel having a second rotational position, determine, based the first rotational position and a first parameter, a third rotational position having a first offset from the second rotational position, actuate, via the steering assist system, the steering wheel to the third rotational position, disengage the steering assist system, the disengagement causing the steering wheel to rotate to a fourth rotational position, and compare the first rotational position to the fourth rotational position to determine if the request has been satisfied.

21 Claims, 8 Drawing Sheets

… (1)

METHODS AND APPARATUS TO CORRECT FOR STEERING WHEEL ROTATION

FIELD OF THE DISCLOSURE

This disclosure relates generally to vehicles, and more particularly, to methods and apparatus to correct for steering wheel rotation.

BACKGROUND

A steering wheel is configured to change a driving direction of a vehicle based on a rotation of the steering wheel. For example, a driver rotating the wheel in a given direction causes a system of pivoted joints to interact, thereby transferring the rotational motion of the steering wheel into a pivoting motion of one or more road wheels. Known steering systems include rack and pinion systems as well as steering box systems. The rack and pinion systems rely on a gear wheel (e.g., a pinion) at the base of the steering column that causes a rack to translate from side to side, propagating the motion to the road wheels. The steering box systems includes worm gears, which can be used to move a drop arm linked by a track rod to a steering arm, resulting in the movement of the front wheels. Modern vehicle steering wheels can be configured to retract toward the dashboard to allow additional cabin space.

SUMMARY

An example vehicle disclosed herein includes a steering assist system, a steering wheel, a user interface, and a steering controller to detect, via the user interface, a request to move the steering wheel of a vehicle to a first rotational position, the steering wheel having a second rotational position, determine, based the first rotational position and a first parameter, a third rotational position having a first offset from the second rotational position, actuate, via the steering assist system, the steering wheel to the third rotational position, disengage the steering assist system, the disengagement causing the steering wheel to rotate to a fourth rotational position, and compare the first rotational position to the fourth rotational position to determine if the request has been satisfied.

An example method disclosed herein includes detecting a request to move a steering wheel of a vehicle to a first rotational position, the steering wheel having a second rotational position, determining, based the first rotational position and a first parameter, a third rotational position having a first offset from the second rotational position, actuating, via a steering assist system, the steering wheel to the third rotational position, disengaging the steering assist system, the disengagement causing the steering wheel to rotate to a fourth rotational position, and comparing the first rotational position to the fourth rotational position to determine if the request has been satisfied.

An example non-transitory computer readable medium disclosed herein includes instructions which, when executed, cause a processor to at least detect a request to move a steering wheel of a vehicle to a first rotational position, the steering wheel having a second rotational position, determine, based the first rotational position and a first parameter, a third rotational position having a first offset from the second rotational position, actuate, via a steering assist system, the steering wheel to the third rotational position, disengage the steering assist system, the disengagement causing the steering wheel to rotate to a fourth rotational position, and compare the first rotational position to the fourth rotational position to determine if the request has been satisfied.

Figure 1:
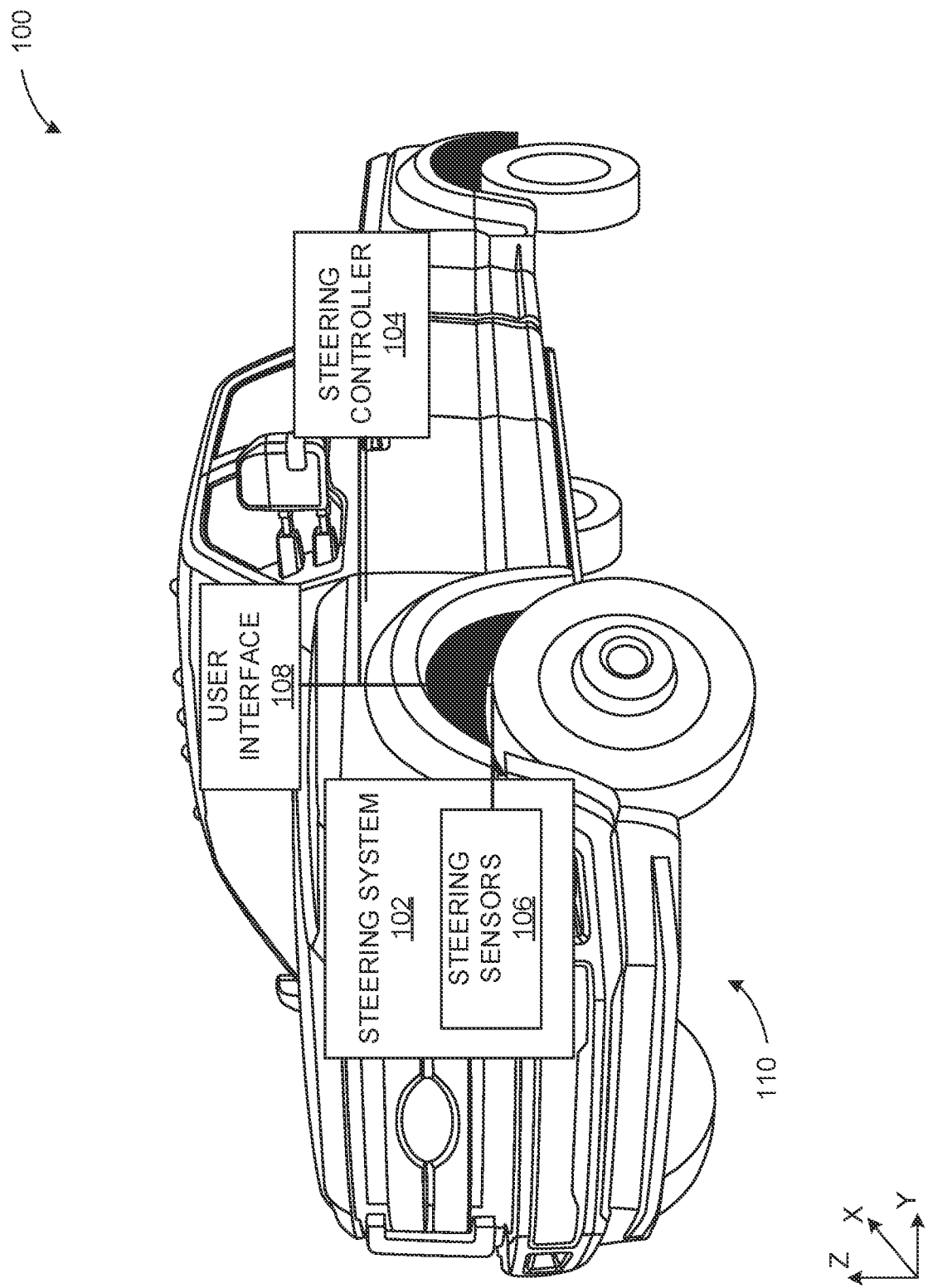
FIG. 1 is a perspective view of a vehicle in which examples disclosed herein can be implemented.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

DETAILED DESCRIPTION

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

As used herein, the orientation of features is described with reference to a lateral axis, a vertical axis, and a longitudinal axis of the vehicle associated with the features. As used herein, the longitudinal axis of the vehicle is parallel to a centerline of the vehicle. The terms "rear" and "front" are used to refer to directions along the longitudinal axis closer to the rear of the vehicle and the front of the vehicle, respectively. As used herein, the vertical axis of the vehicle is perpendicular to the ground on which the vehicle rests. As used herein, the lateral axis of the vehicle is perpendicular to the longitudinal and vertical axes and is generally parallel to the axles of the vehicle. As used herein, the terms "longitudinal," and "axial" are used interchangeably to refer to directions parallel to the longitudinal axis. As used herein, the terms "lateral" and "horizontal" are used to refer to directions parallel to the lateral axis. As used herein, the term "vertical" and "normal" are used interchangeably to refer to directions parallel to the vertical axis.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

A stowable steering wheel can be used to provide additional room in a vehicle cabin for multiple uses. For example, a driver entering or exiting a vehicle can have additional space to maneuver. Power steering system components in addition to the steering wheel can include a steering column, a steering coupler, steering gear, and a power steering pump. Electric power steering systems, as compared to hydraulic systems, can include additional and/or different components such as sensors, actuators, motors, and an electronic control unit. Hydraulic power steering relies on hydraulic pressure supplied by an engine-driven pump. Electric power steering systems use an electric motor that is attached to the steering rack or the steering column, while the electronic control unit determines the steering dynamics.

Known steering systems include rack and pinion systems as well as steering box systems. The rack and pinion system rely on a gear wheel (e.g., a pinion) at the base of the steering column that causes a rack to translate from side to side, propagating the motion to the road wheels. For example, the pinion gear can be connected to a steering shaft such that as the steering wheel turns, the pinion gear rotates while moving the rack in a linear motion. As such, when the wheel is turned, the pinion gear rotates, moving the rack in a back-and-forth motion that turns the wheels left or right. In contrast to the rack and pinion systems, the steering box systems include worm gears, which can be used to move a drop arm linked by a track rod to a steering arm, resulting in the movement of the front wheels.

In vehicles that include a stowable steering wheel, it is necessary to return a steering wheel position back to the center before the steering wheel is stowed. While the steering position can be easily returned to the center when actuators are providing forces to hold a steering position, residual forces caused by the suspension system and the steering system, compensated for by the actuators, can cause the steering wheel to turn after the disengagement of the actuators. As such, when a vehicle is turned off (e.g., when parked) and the actuators of the steering assist system are disengaged, the angular or rotational position of the steering wheel can change, which can make stowing the steering wheel difficult.

Examples disclosed herein enable a steering wheel of a vehicle to be adjusted to a desired rotational position by compensating for residual forces from the suspension system and steering system that occur after the steering assist of a vehicle is disengaged. In some examples disclosed herein, an overshoot position offset from the desired position is determined based on at least one of the steering torque, the steering pinion angle, the steering wheel rotational position, the steering motor torque, and/or the electric steering motor current. In some examples, after adjusting the rotational position of the steering wheel to the overshoot position, the steering assist is disengaged, and the recoil rotation causes the steering wheel to rotate back to the target position.

FIG. 1 is a perspective view of a vehicle 100 in which examples disclosed herein can be implemented. In the illustrated example of FIG. 1, the vehicle 100 includes an example steering system 102, an example steering controller 104, example steering sensors 106, an example user interface 108, and an example suspension system 110.

The vehicle 100 is a motorized wheel-driven vehicle. In the illustrated example of FIG. 1, the vehicle 100 is a pick-up truck. In other examples, the vehicle 100 can be any type of wheeled vehicle (e.g., a sedan, a coupe, a van, a sports utility vehicle, an all-terrain vehicle (ATV), farming equipment, etc.). In some examples, the vehicle 100 includes an internal combustion engine (e.g., a non-electrified vehicle, a partially electrified vehicle, etc.). In other examples, the vehicle 100 is a fully electric vehicle.

The steering system 102 allows a user of the vehicle 100 to control/steer the vehicle 100. In the illustrated example of FIG. 1, the steering system 102 includes a mechanical linkage between a user interface of the vehicle 100 (e.g., a steering wheel, etc.) and the wheels of the vehicle 100 (e.g., via a steering column and rack and pinion system, etc.). In other examples, the steering system 102 can be a steer-by-wire system and/or a partially steer-by-wire system. In the illustrated example of FIG. 1, the steering system 102 includes an electric powered steering system. In other examples, the steering system 102 can include any suitable type of powered steering and/or steering assist (e.g., hydraulic, hybrid electro-hydraulic systems, etc.). In some examples, the steering system 102 includes an external angle controller, which allows the angle of a steering wheel to be adjusted.

The steering controller 104 controls and/or regulates the steering system 102. For example, the steering controller 104 can calculate an overshoot angle based on parameters received from sensors of the steering system 102. In some examples, the steering controller 104 determines the overshoot angle such that after the steering assist of the vehicle 100 is disengaged, the recoil rotation caused by the residual forces of the steering system 102 and the suspension system 110 caused the steering wheel 200 (FIG. 2) to rotate back to the desired position. In some examples, the steering controller 104 can iterate (e.g., repeat, etc.) the overshoot calculation and steering wheel adjustment process if the steering wheel is not in the desired angular and rotational position. In some examples, some or all of the steering controller 104 can be implemented by an electronic control unit (ECU) of the vehicle 100. In other examples, the steering controller 104 can be implemented by another suitable computer (e.g., another computer of the vehicle 100, a mobile device of a user of the vehicle 100, a remote computer, etc.).

The steering sensors 106 include one or more sensors that measure different metrics related to the steering sensors. For example, the steering sensors 106 can measure the position of a steering wheel, a speed of the steering wheel, a position of the steering system (e.g., a position of the steering rack and pinion, etc.), system parameters related to the power steering system, etc. Example steering sensors 106 are described below in conjunction with FIG. 2.

The user interface 108 enables a user of the vehicle 100 to receive and input information from/to the steering controller 104 and other systems of the vehicle 100. For example, the user interface 108 can be implemented by a display of the vehicle 100. Additionally or alternatively, the user interface 108 can include one or more dash indicator(s), one or more button(s) on the dashboard or steering wheel, one or more speakers, one or more microphones, etc. In some examples, the user interface 108 can be implemented by a mobile device of the user (e.g., a mobile phone, a smartwatch, a tablet, etc.).

The vehicle 100 includes an example suspension system 110. The suspension system 110 can include an independent suspension (e.g., a wishbone suspension, etc.), a solid axle suspension (e.g., a leaf spring suspension, etc.) or a combination thereof (e.g., a front axle independent suspension, a rear axle dependent suspension, etc.). In some examples, the suspension system 110 can exert residual forces on the steering system 102. In some examples, the residual forces can cause a steering system 102 to move after a steering assist of the steering assist is disengaged.

Figure 2:
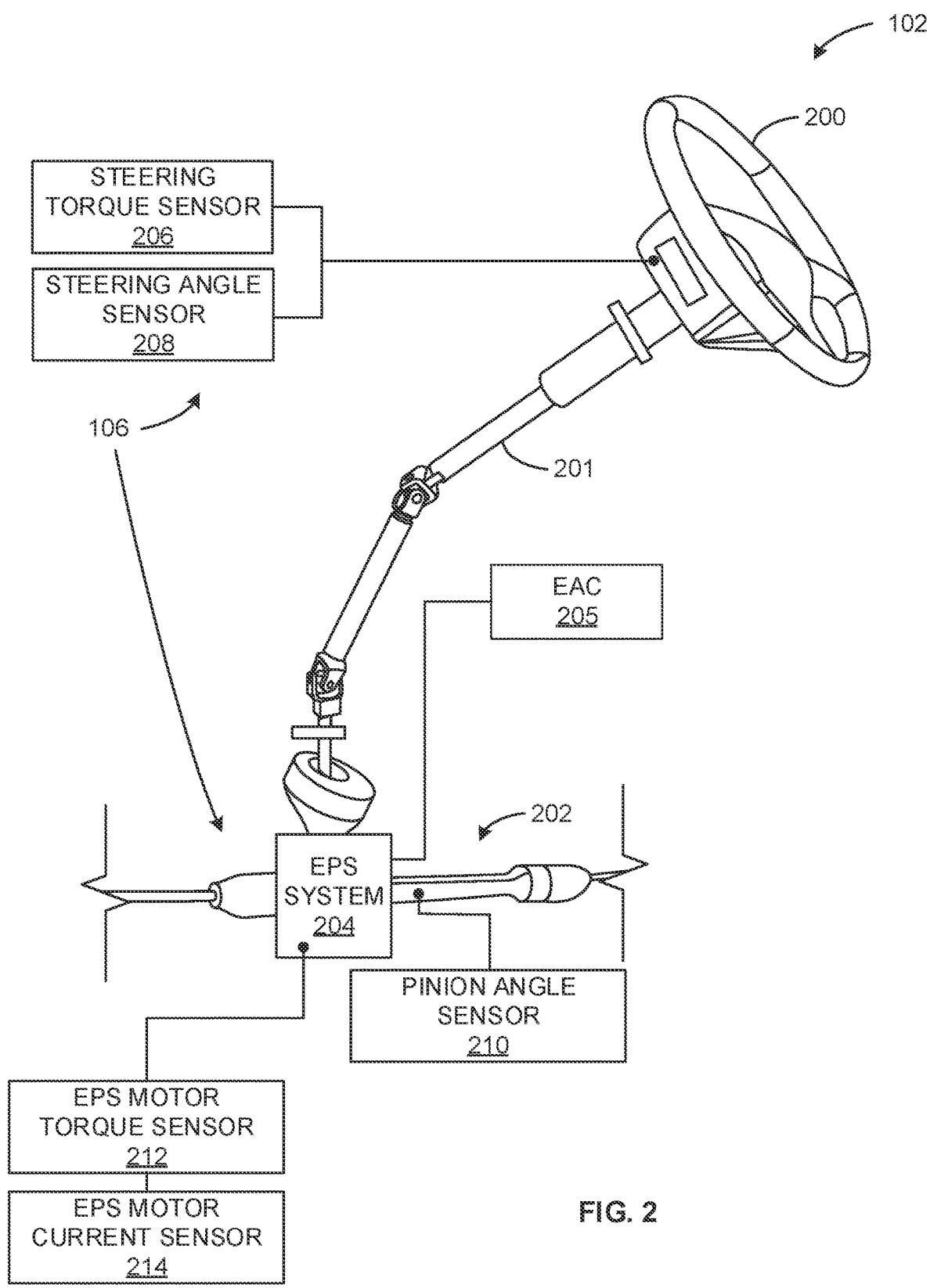
FIG. 2 is a system diagram of the steering system of FIG. 1.

FIG. 2 is a system diagram of the steering system 102 of FIG. 1 that includes the steering sensors 106. The steering system 102 includes an example steering wheel 200, an example steering column 201, an example rack and pinion system 202, an example electric power steering (EPS) system 204, and an external angle controller (EAC) 205. The example steering sensors 106 includes an example steering torque sensor 206, an example steering angle sensor 208, an example pinion angle sensor 210, an example EPS motor torque sensor 212, and an example EPS motor current sensor 214.

The steering wheel 200 transmits driver inputs to the steering system 102 (e.g., rotating the steering wheel 200). The steering wheel 200 allows a user of the vehicle to operate the steering system 102 and thereby steer the vehicle 100. In the illustrated example of FIG. 2, the steering wheel 200 is coupled to the steering column 201. The steering wheel 200 includes an interface (e.g., handgrips, etc.) that enables a user to apply torque to the steering system 102. In the illustrated example of FIG. 2, the steering wheel 200 is depicted as circular. In other examples, the steering wheel 200 is not circular. In such examples, the non-circularity or rotational asymmetry of the steering wheel 200 prevents the steering wheel 200 from being stowed when not properly aligned.

The rack and pinion system 202 is a linear actuator that includes a pinion engaged with a rack, which translates rotational inputs from the steering column 201 into linear motion to translate the steering components coupled to the steering column 201. As the driver applies torque to the steering wheel 200, the pinion rotates and provides a linear force to the rack. In the illustrated example of FIG. 2, the EPS system 204 augments torque applied to the steering column 201 by applying additional torque to the steering column 201 and/or the rack and pinion system 202.

The EPS system 204 is a power steering system that provides assistance to the user of the vehicle 100 by augmenting the steering effect applied to the steering wheel 200. In the illustrated example of FIG. 2, the EPS system 204 uses an electric motor to provide assistive torque to the steering column 201. In some examples, the EPS system 204 and/or the steering controller 104 can use inputs from the steering torque sensor 206 and/or steering angle sensor 208 to determine an appropriate amount of assistive torque to be applied via the EPS system 204. The EPS system 204 can provide variable amounts of assistive torque depending on the driving condition (e.g., greater amounts of assistive torque at relatively low vehicle speeds, lesser amounts of assistive torque at relatively high vehicle speeds, etc.).

The EAC 205 provides control to the angular position of the steering wheel 200. For example, the EAC 205 can receive commands from the steering controller 104 to adjust the position of the steering wheel 200. For example, the EAC 205 can be used to move (e.g., rotate, etc.) the steering wheel 200 (e.g., using actuators of the EPS system 204, etc.) independent of user-based interaction. In the illustrated example of FIG. 2, the EAC 205 uses the actuators of the EPS system 204. While the EAC 205 is depicted as part of the EPS system 204 in the illustrated example of FIG. 2, the EAC 205 can be a separate component. In such examples, the EAC 205 can have a dedicated actuator independent from the EPS system 204.

The steering torque sensor 206 measures the steering torque applied to the steering column 201. In some examples, the steering torque sensor 206 is coupled to an upper portion of the steering column 201 (e.g., an input shaft of the steering column 201, an intermediate shaft of the steering column 201, etc.) The steering torque sensor 206 measures the torque exerted by the driver on the steering system 102. In some examples, the steering torque sensor 206 can be implemented by any suitable means of measuring applied torque (e.g., a magnetoelastic torque sensor, a rotary strain gauge, etc.). Additionally or alternatively, the steering torque may be derived from any other suitable measurable quantities.

The steering angle sensor 208 measures an angular or rotational position of the steering wheel 200. In the illustrated example of FIG. 2, the steering angle sensor 208 is disposed adjacent to the steering wheel 200. Additionally or alternatively, the steering angle sensor 208 can be disposed in a steering column 201 of the vehicle (e.g., on an input shaft of the steering wheel 200, etc.). In some examples, the steering angle sensor 208 can be used to determine whether the steering wheel 200 is centered. As used herein, a steering wheel is "centered" when the steering wheel is in a position associated with the vehicle moving in a direction aligned with the longitudinal axis of the vehicle and all other steering wheel positions corresponding to that position. In some examples, a steering system may have multiple centered positions (e.g., 3, 5, 7, etc.) that correspond to positions offset by a full rotation (e.g., 360 degrees, etc.) for each other. The steering angle sensor 208 can be implemented by any suitable means of measuring steering angle (e.g., a rotary encoder, an optical encoder, a Hall-effect sensor, a resolver, magnetic sensor, etc.). Additionally or alternatively, the steering angle may be derived from other metrics (e.g., steering velocity, steering acceleration, steering torque, etc.).

The pinion angle sensor 210 measures the position of pinion in the rack and pinion system 202. For example, the pinion angle sensor 210 can determine the position of the pinion of the rack and pinion system 202 relative to the rack and/or steering column 201. In some examples, the pinion angle sensor 210 can be implemented by any suitable means of measuring the angular and/or rotational position of the pinion (e.g., an optical sensor, a magnetic sensor, linear position sensor, angular position sensor, inclinometers, etc.). Additionally or alternatively, the pinion angle may be derived from other metrics (e.g., steering velocity, steering acceleration, steering torque, etc.).

The EPS motor torque sensor 212 measures the torque of an electric motor of the EPS system 204. In some examples, the EPS motor torque sensor 212 can be implemented by any suitable means of measuring torque (e.g., a magnetoelastic torque sensor, a rotary strain gauge, etc.). Additionally or alternatively, the EPS motor torque may be derived from any suitable measurable quantities.

The EPS motor current sensor 214 measures the electric current of the motor of the EPS system 204. In some examples, the EPS motor current sensor 214 can be implemented by any suitable means of measuring current (e.g., hall-effect sensors, shunt resistor isolated modulators, cored current sensors, coreless current sensors, etc.).

In some examples, residual forces (e.g., spring forces, normal forces) associated with a vehicle suspension system (e.g., suspension system 110 of FIG. 1, etc.) and the steering system 102 can cause the steering system 102 to rotate after the EPS system 204 is disengaged from the steering system 102. As used herein, the rotation of the steering wheel 200 and/or steering column 201 after the disengagement of the EPS system 204 is referred to as the "recoil rotation."

Figure 3C:
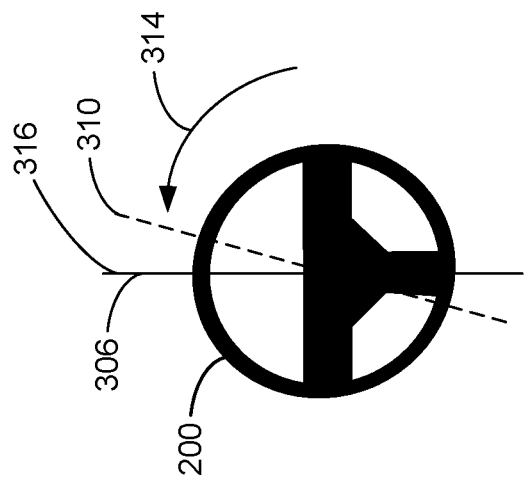
FIGS. 3A-3C are illustrations of various steering wheel positions during an example steering wheel adjustment process executed by the steering controller of FIG. 1.
Figure 3B:
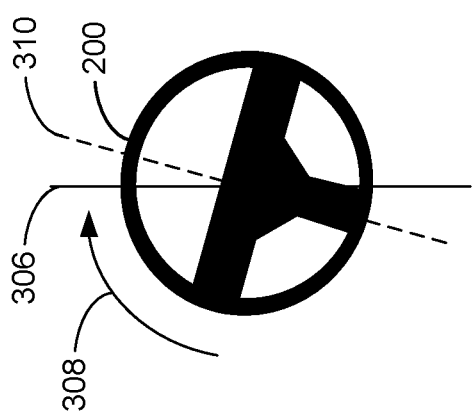
Figure 3A:
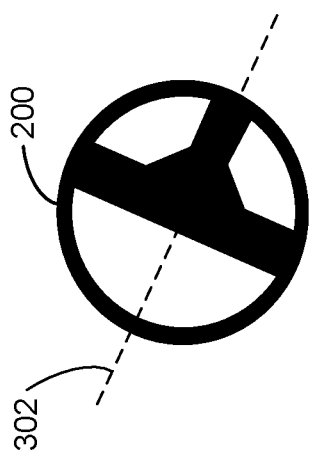

FIG. 3A illustrates the example of steering wheel 200 in an example first position 302. In the illustrated example of FIG. 3A, the steering wheel 200 has been moved, turned, rotated, etc. by a user of the vehicle 100 into the first position 302. In some examples, a user of the vehicle 100 has maneuvered the vehicle 100 into a situation where it is safe to stop the vehicle 100 (e.g., parked in a parking space, parallel parked, etc.). In the illustrated example of FIG. 3A, in the process of making these maneuvers, the steering wheel 200 is not centered and cannot be properly stowed closer to the vehicle dashboard. In the illustrated example of FIG. 3A, the actuators of the EPS system 204 are engaged with the steering column 201.

In the illustrated example of FIG. 3B, a user (e.g., a driver of the vehicle 100 of FIG. 1, etc.) has requested a target steering wheel position 306 (e.g., to stow the steering wheel 200, etc.) The steering wheel 200 has undergone a rotation 308 to reach the example overshoot position 310. In some examples, the target steering wheel position 306 corresponds to the position of the steering wheel 200 that enables the steering wheel 200 to be properly stowed. In other examples, the target steering wheel position 306 can correspond to any other suitable steering wheel angular or rotational position and/or corresponding position of the wheels of the vehicle 100.

In some examples, the EAC 205 engages and rotates the steering column 201 to cause the steering wheel 200 to undergo the rotation 308. For example, the EAC 205 can cause one or more actuator of the EPS system 204 to apply a torque to the steering column 201. In the illustrated example of FIG. 3B, the EAC 205 rotates the steering wheel 200 to the overshoot position 310 to compensate for the residual forces acting on the steering column 201. In some examples, the residual forces cause the steering column 201 to rotate in the opposite direction of the rotation 308. In some examples, the magnitude of the recoil is determined by the steering controller 104. In some such examples, the overshoot position 310 and corresponding magnitude of the rotation 308 is determined by the steering controller 104 such that the recoil causes the steering wheel 200 to rotate back to the target position 306. In the illustrated example of FIG. 3B, the overshoot position 310 is offset from the target steering wheel position 306. In some examples, the offset is determined based on the expected recoil rotation associated with the steering wheel 200, which is described below in relation to FIG. 3C.

FIG. 3C illustrates the example steering wheel 200 after the disengagement of the EPS system 204. In the illustrated example of FIG. 3C, the steering wheel 200 has undergone an example recoil rotation 314 to an example fourth position 316, which coincides with the target position 306. In the illustrated example of FIG. 3C, the EPS system 204 has been disengaged from the steering column 201, which causes the recoil rotation 314. Because the steering controller 104 determined the overshoot position 310 based on an estimation of the recoil rotation 314, the recoil rotation 314 causes the steering wheel 200 to rotate from the overshoot position 310 to the fourth position 316, which coincides with the target steering wheel position 306.

In some examples, the steering controller 104 can incorrectly estimate the recoil rotation 314 and thus select an improper overshoot position. In some such examples, the steering controller 104 can determine the steering wheel 200 is able to be stowed (e.g., within a threshold distance from the target steering wheel position 306, etc.). In such examples, the steering controller 104 causes the steering wheel 200 to be stowed. In other examples, if the steering controller 104 determines the steering wheel 200 is not able to be stowed, the steering controller 104 can reengage the EPS system 204 and repeat the steps illustrated in FIGS. 3A-3C. In such examples, the current position of the steering wheel (e.g., the position of the steering wheel 200 after the recoil rotation 314, etc.) is treated as the initial position of the steering wheel (e.g., the first position 302 of FIG. 3 3A, etc.) and the process set forth in FIGS. 3A-3C are repeated.

Figure 4:
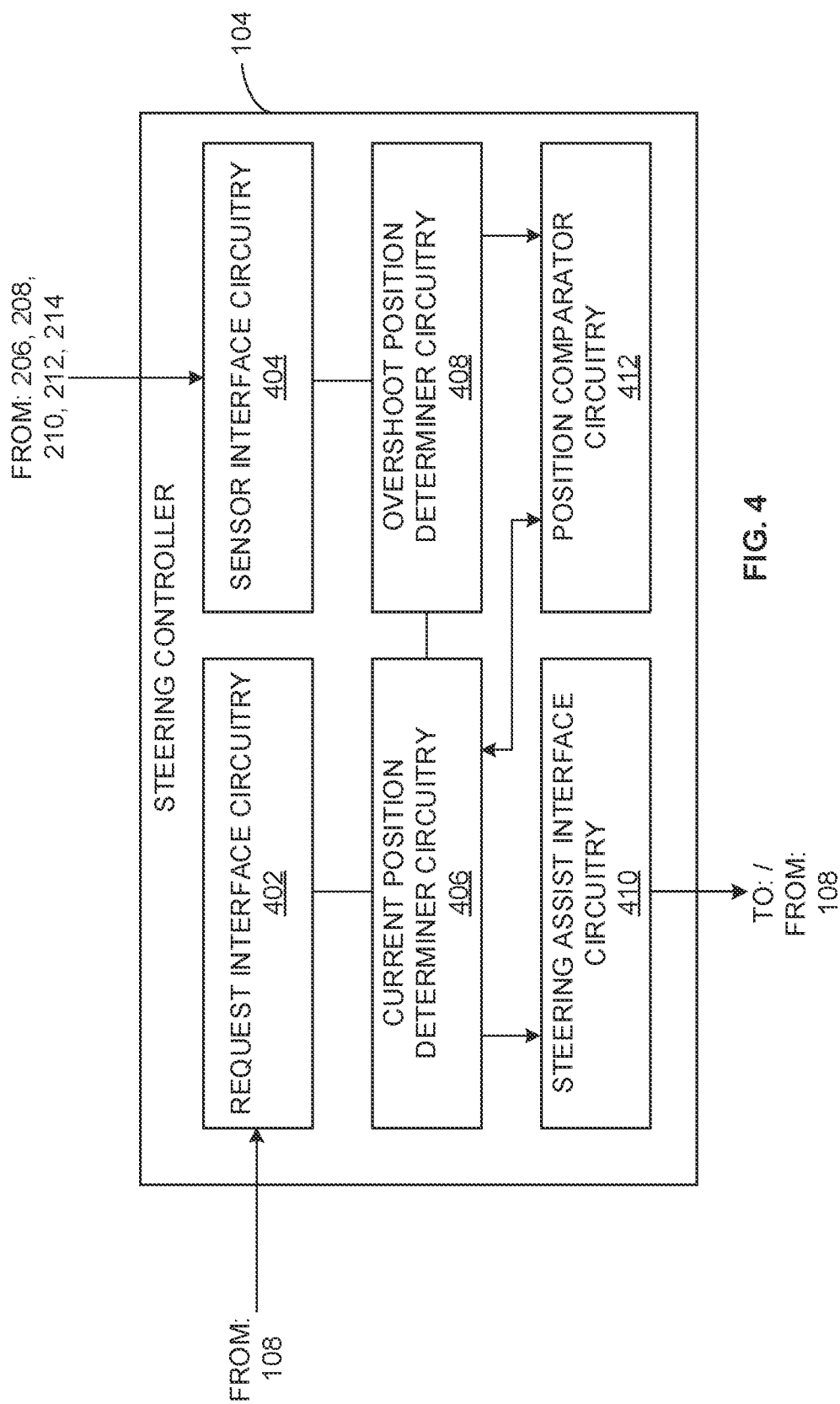
FIG. 4 is a block diagram of an example implementation of the steering wheel controller of FIG. 1.

FIG. 4 is a block diagram of an example implementation of the steering controller 104 of FIG. 1. In the illustrated example of FIG. 4, the steering controller 104 includes example request interface circuitry 402, example sensor interface circuitry 404, example current position determiner circuitry 406, example overshoot position determiner circuitry 408, example steering assist interface circuitry 410, and example position comparator circuitry 412.

The request interface circuitry 402 receives (e.g., accesses, detects, etc.) a request from a user of the vehicle 100 to move the steering wheel 200 to a target position. For example, the user can request to center the steering wheel 200 to facilitate the stowing of the steering wheel 200. In other examples, the user can request the steering wheel 200 move to any other rotational position. Additionally or alternatively, a request can generated in response to a specific vehicle action (e.g., the vehicle 100 is shifted into park, the parking brake is engaged, etc.) and/or other user input (e.g., the user requests to the stow the steering wheel 200, the user requests access to a tray table, the user requests self-driving mode, etc.). In some examples, the request interface circuitry 402 can be in communication with the user interface 108 to detect if the user inputs a request. In other examples, the request interface circuitry 402 can detect a request by any other suitable means.

The sensor interface circuitry 404 receives sensor data from the sensors of the example vehicle 100 and the steering system 102. For example, the sensor interface circuitry 404 can receive input from the steering torque sensor 206, the steering angle sensor 208, the pinion angle sensor 210 the EPS motor torque sensor 212, the EPS motor current sensor 214 and/or any other sensors (e.g., wheel position sensor, weight sensors, etc.). In some examples, the sensor interface circuitry 404 distributes received sensor data to at least one of the current position determiner circuitry 406, the overshoot position determiner circuitry 408, the steering assist interface circuitry 410, and the position comparator circuitry 412. In some examples, the sensor interface circuitry 404 can distribute data from the steering angle sensor 208 to the current position determiner circuitry 406, etc.

The current position determiner circuitry 406 determines the current position of the steering wheel 200. For example, the current position determiner circuitry 406 can determine the current position of the steering wheel 200 based on data from (e.g., via the sensor interface circuitry 404, etc.) the steering torque sensor 206 and/or the steering angle sensor 208. In some examples, the current position determiner circuitry 406 can determine the position of the steering wheel relative to the centered position of the steering wheel 200. In other examples, the current position determiner circuitry 406 can determine the current position of the steering wheel 200 by any other suitable means.

The overshoot position determiner circuitry 408 determines the overshoot position (e.g., the overshoot position 310 of FIGS. 3B-3C, etc.) based on a parameter of the sensor data (e.g., via the sensor interface circuitry 404, etc.) and the requested target position (e.g., via the request interface circuitry 402, etc.). For example, the overshoot position determiner circuitry 408 can determine the overshoot position based on an expected recoil rotation (e.g., the recoil rotation 314, etc.) caused by the disengagement of the EPS system 204. In such examples, the overshoot position determiner circuitry 408 determines the overshoot position such that the recoil rotation caused by the disengagement of the EPS system 204 causes the steering wheel 200 to rotate to the target position. In some examples, the overshoot position determiner circuitry 408 determines the overshoot position and/or the expected recoil rotation using a look-up table with inputs based on parameters received from the steering torque sensor 206, the steering angle sensor 208, the EPS motor torque sensor 212, the EPS motor current sensor 214, etc. In some examples, the look-up table can be generated empirically (e.g., during calibration during the manufacture and/or assembly of the vehicle 100, etc.) and/or estimated based on the geometric and/or material properties of the steering system 102. Additionally or alternatively, the overshoot position determiner circuitry 408 can estimate the load on the rack and pinion system 202 based on sensor data received from the steering torque sensor 206, the steering angle sensor 208, the pinion angle sensor 210, the EPS motor torque sensor 212, the EPS motor current sensor 214, etc. to dynamically determine the overshoot position.

The steering assist interface circuitry 410 interfaces with the steering system 102. For example, the steering assist interface circuitry 410 can cause the EPS system 204 to engage and/or disengage with the steering column 201. In some examples, the steering assist interface circuitry 410 causes the EAC 205 to rotate the steering column 201 and steering wheel 200 to a position (e.g., the overshoot position, etc.). In some examples, the steering assist interface circuitry 410 can cause the steering wheel 200 to retract into a stowed position.

The position comparator circuitry 412 compares the current position of the steering wheel 200 (e.g., as determined by the current position determiner circuitry 406, etc.) to the target position of the steering wheel 200. For example, the position comparator circuitry 412 can determine the difference between the current position of the steering wheel 200 and the target position of the steering wheel 200. In some examples, the position comparator circuitry 412 can compare the determined difference to a threshold difference. In some such examples, if the position comparator circuitry 412 determines the difference satisfies the threshold, the position comparator circuitry 412 causes the steering assist interface circuitry 410 to stow the steering wheel 200. In some such examples, if the position comparator circuitry 412 determines the difference does not satisfy the difference threshold, the position comparator circuitry 412 causes the overshoot position determiner circuitry 408 and steering assist interface circuitry 410 to repeat the overshoot angle calculation and steering wheel position adjustment process. In some examples, the threshold difference is based on the allowable positions of the steering wheel 200 that enable the stowing of the steering wheel 200 (e.g., +/−1 degree, +/−3 degrees, etc.). In other examples, the threshold difference can be any other suitable value.

While an example manner of implementing the steering controller 104 of FIG. 1 is illustrated in FIG. 4, one or more of the elements, processes, and/or devices illustrated in FIG. 4 may be combined, divided, re-arranged, omitted, eliminated, and/or implemented in any other way. Further, the example request interface circuitry 402, the example sensor interface circuitry 404, the example target position determiner circuitry 406, the example current position determiner circuitry 408, the example steering assist interface circuitry 410, the example position comparator circuitry 412, and/or, more generally, the example steering controller 104 of FIG. 1, may be implemented by hardware, software, firmware, and/or any combination of hardware, software, and/or firmware. Thus, for example, any of the example request interface circuitry 402, the example sensor interface circuitry 404, the example target position determiner circuitry 406, the example current position determiner circuitry 408, the example steering assist interface circuitry 410, the example position comparator circuitry 412, and/or, more generally, the example steering controller 104 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example request interface circuitry 402, the example sensor interface circuitry 404, the example target position determiner circuitry 406, the example current position determiner circuitry 408, the example steering assist interface circuitry 410, the example position comparator circuitry 412 is/are hereby expressly defined to include a non-transitory computer readable storage device or storage disk such as a memory, a digital versatile disk (DVD), a compact disk (CD), a Blu-ray disk, etc., including the software and/or firmware. Further still, the example steering controller 104 of FIG. 1 may include one or more elements, processes, and/or devices in addition to, or instead of, those illustrated in FIG. 4, and/or may include more than one of any or all of the illustrated elements, processes and devices.

A flowchart representative of example hardware logic circuitry, machine readable instructions, hardware implemented state machines, and/or any combination thereof for implementing the steering controller 104 of FIGS. 1 and 3 is shown in FIG. 4. The machine readable instructions may be one or more executable programs or portion(s) of an executable program for execution by processor circuitry, such as the processor circuitry 612 shown in the example processor platform 600 discussed below in connection with FIG. 6 and/or the example processor circuitry discussed below in connection with FIGS. 7 and/or 8. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 5, many other methods of implementing the example steering controller 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 5:
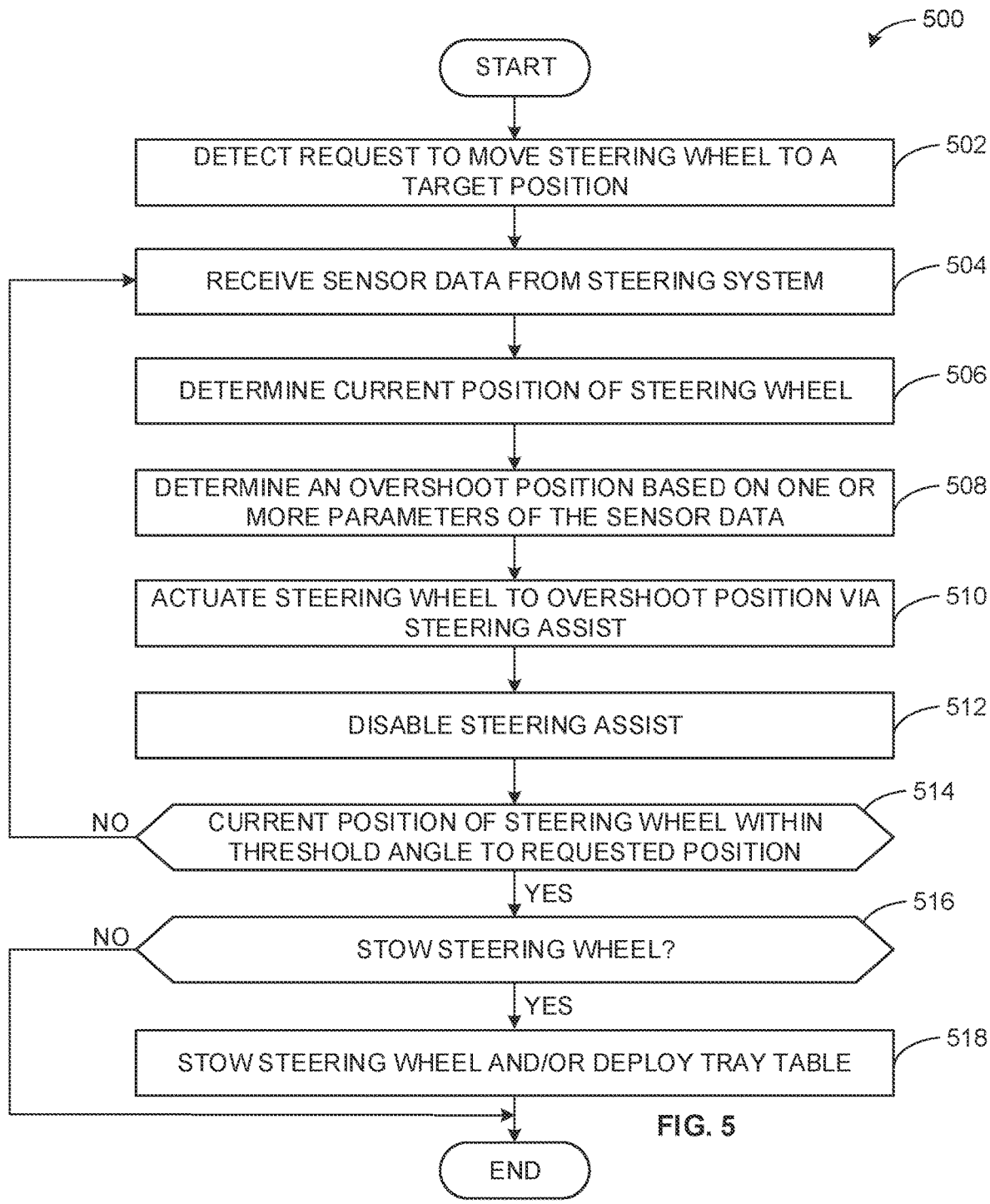
FIG. 5 is a flowchart representative of example machine readable instructions that may be executed by example processor circuitry to implement the steering controller of FIGS. 1 ad/or 4.

FIG. 5 is a flowchart representative of example machine readable instructions and/or example operation(s) 500 that may be executed and/or instantiated by processor circuitry to adjust a position of the steering wheel 200. The machine-readable instructions and/or operations 500 of FIG. 5 begin at block 502, at which the request interface circuitry 402 detects a request to move the steering wheel 200 to a target position 306. For example, the request interface circuitry 402 can detect a request to move steering wheel 200 input via the user interface 108. In other examples, the request interface circuitry 402 can detect an automatic request triggered by a vehicle event (e.g., the vehicle be putting park, a request to stow the steering wheel 200, etc.).

At block 504, the sensor interface circuitry 404 receives sensor data from the steering system 102. For example, the sensor interface circuitry 404 can receive sensor inputs from the steering torque sensor 206, the steering angle sensor 208, the pinion angle sensor 210 the EPS motor torque sensor 212, the EPS motor current sensor 214 and/or any other sensors (e.g., wheel position sensor, weight sensors, etc.). In other examples, the sensor interface circuitry 404 can transform a sensor output (e.g., a signal output by a sensor) into a human-readable format (e.g., a number, a string, etc.).

At block 506, the current position determiner circuitry 406 determines the current position of the steering wheel 200. For example, the current position determiner circuitry 406 can determine the current position of the steering wheel 200 based on one or more sensor readings accessed by the sensor interface circuitry 404. In some examples, the current position determiner circuitry 406 can determine the current position of the steering wheel 200 based on the readings of the steering angle sensor 208. In other examples, the current position determiner circuitry 406 can determine the current position of the steering wheel 200 by any other suitable means.

At block 508, the overshoot position determiner circuitry 408 determines an overshoot position based on one or more parameter(s) of the sensor data. For example, the overshoot position determiner circuitry 408 can determine the overshoot position based on an expected recoil rotation caused by the disengagement of the EPS system 204. In some examples, the overshoot position determiner circuitry 408 determines the overshoot position such that the recoil rotation caused by the disengagement of the EPS system 204 causes the steering wheel 200 to rotate to the target position. In some examples, the overshoot position determiner circuitry 408 determines the overshoot position using a look-up table with inputs based on sensor data received from the steering torque sensor 206, the steering angle sensor 208, the EPS motor torque sensor 212, the EPS motor current sensor 214, et. Additionally or alternatively, the overshoot position determiner circuitry 408 can estimate the load on the rack and pinion system 202 based on sensor data received from the steering torque sensor 206, the steering angle sensor 208, the pinion angle sensor 210, the EPS motor torque sensor 212, the EPS motor current sensor 214, etc. to dynamically determine the overshoot position.

At block 510, the steering assist interface circuitry 410 actuates the steering wheel 200 to the overshoot position 310. For example, the steering assist interface circuitry 410 can cause the EAC 205 to engage the steering column 201 such that the steering wheel 200 moves to the overshoot position 310. In some examples, the steering assist interface circuitry 410 can be a closed-loop process and incorporate readings from the steering angle sensor 208 and/or the current position determiner circuitry 406 can provide feedback regarding the position of the steering wheel 200. In other examples, the steering assist interface circuitry 410 and/or the EAC 205 can cause the steering wheel 200 to move to the overshoot position 310.

At block 512, the steering assist interface circuitry 410 disables the steering assist. For example, the steering assist interface circuitry 410 can cause an actuator of the EAC 205 and/or EPS system 204 to disengage from the steering column. In other examples, the steering assist interface circuitry 410 can cause the steering assist to disengage by any other suitable means. In some examples, the disengagement of the steering assist causes the steering wheel 200 to undergo a recoil rotation (e.g., the recoil rotation 314 of FIG. 3C, etc.).

At block 514, the position comparator circuitry 412 determines if the current position of steering wheel within threshold angle to requested position. For example, the position comparator circuitry 412 can compare the difference between the current position and the request position to a threshold difference. In some such examples, if the position comparator circuitry 412 determines the difference satisfies the threshold, the operation 500 advances to block 518. If the position comparator circuitry 412 determines the difference does not satisfy the difference threshold, the operation 500 returns to block 504.

At block 516, the steering assist interface circuitry 410 determines if the steering wheel 200 is to be stowed. For example, the steering assist interface circuitry 410 can determine if the user has input a request to stow the steering wheel. In other examples, the steering assist interface circuitry 410 can determine if the steering wheel is going to be stowed by any other suitable means. If the steering wheel is to be stowed, the operation 500 advances to block 518. If the steering wheel is not to be stowed, the operation advances to block 518. At block 518, the steering assist interface circuitry 410 stows the steering wheel. For example, the steering assist interface circuitry 410 can cause the steering wheel 200 can cause the steering wheel 200 to stow. The operation 500 then ends.

Figure 6:
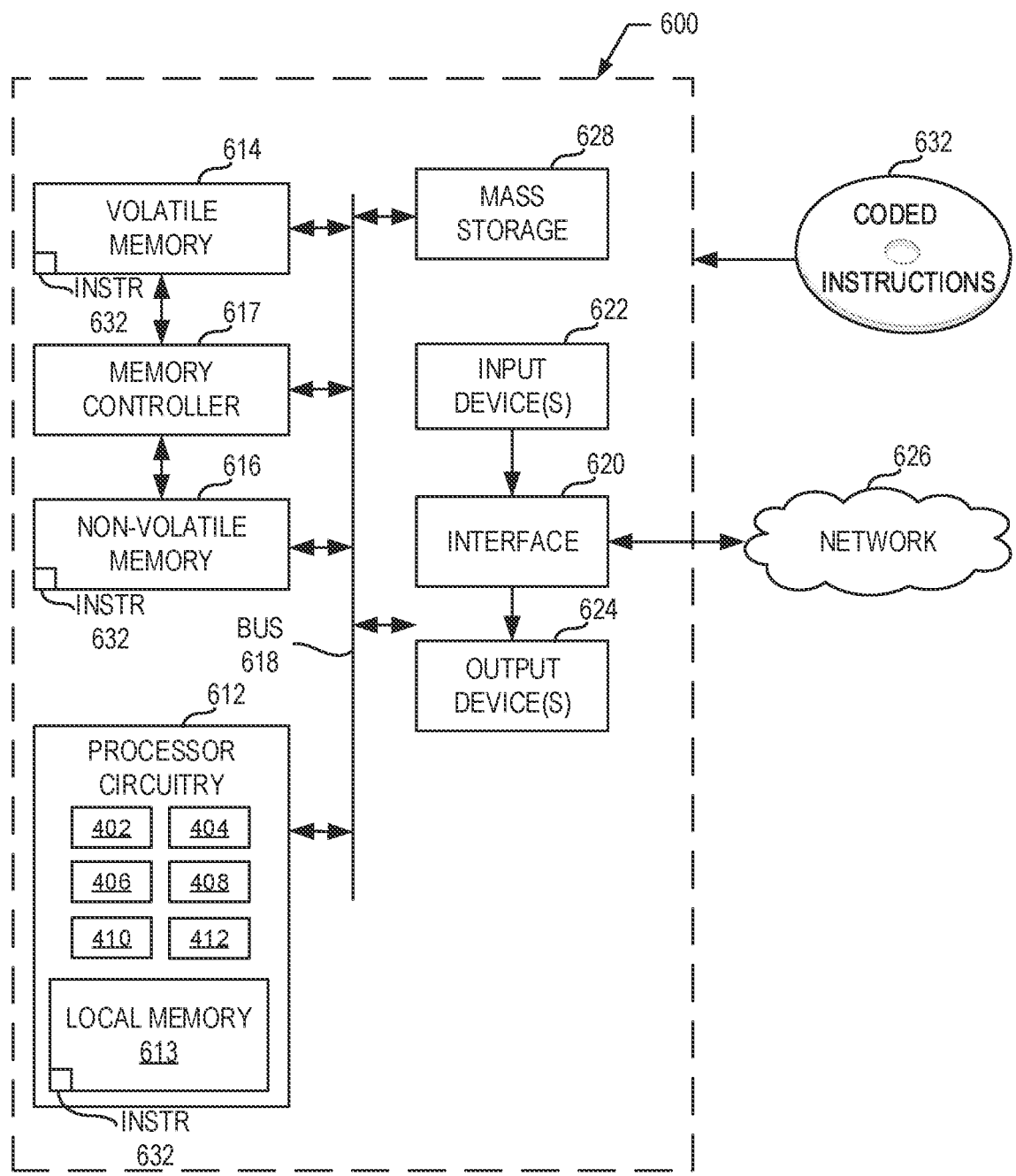
FIG. 6 is a block diagram of an example processing platform including processor circuitry structured to execute the example machine readable instructions of FIG. 3 to implement steering controller of FIGS. 1 and/or 4.

FIG. 6 is a block diagram of an example processor platform 600 structured to execute and/or instantiate the machine readable instructions and/or operations of FIG. 5 to implement the steering controller 104 of FIGS. 1 and 4. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 600 of the illustrated example includes processor circuitry 612. The processor circuitry 612 of the illustrated example is hardware. For example, the processor circuitry 612 can be implemented by one or more integrated circuits, logic circuits, FPGAs microprocessors, CPUs, GPUs, DSPs, and/or microcontrollers from any desired family or manufacturer. The processor circuitry 612 may be implemented by one or more semiconductor based (e.g., silicon based) devices. In this example, the processor circuitry 612 implements the request interface circuitry 402, the sensor interface circuitry 404, the current position determiner circuitry 406, the overshoot position determiner circuitry 408, the steering assist interface circuitry 410, and the example position comparator circuitry 412.

The processor circuitry 612 of the illustrated example includes a local memory 613 (e.g., a cache, registers, etc.). The processor circuitry 612 of the illustrated example is in communication with a main memory including a volatile memory 614 and a non-volatile memory 616 by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617.

The processor platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 622 are connected to the interface circuitry 620. The input device(s) 622 permit(s) a user to enter data and/or commands into the processor circuitry 612. The input device(s) 622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 624 are also connected to the interface circuitry 620 of the illustrated example. The output devices 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 600 of the illustrated example also includes one or more mass storage devices 628 to store software and/or data. Examples of such mass storage devices 628 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 632, which may be implemented by the machine readable instructions of FIG. 5, may be stored in the mass storage device 628, in the volatile memory 614, in the non-volatile memory 616, and/or on a removable non-transitory computer readable storage medium such as a CD or DVD.

Figure 7:
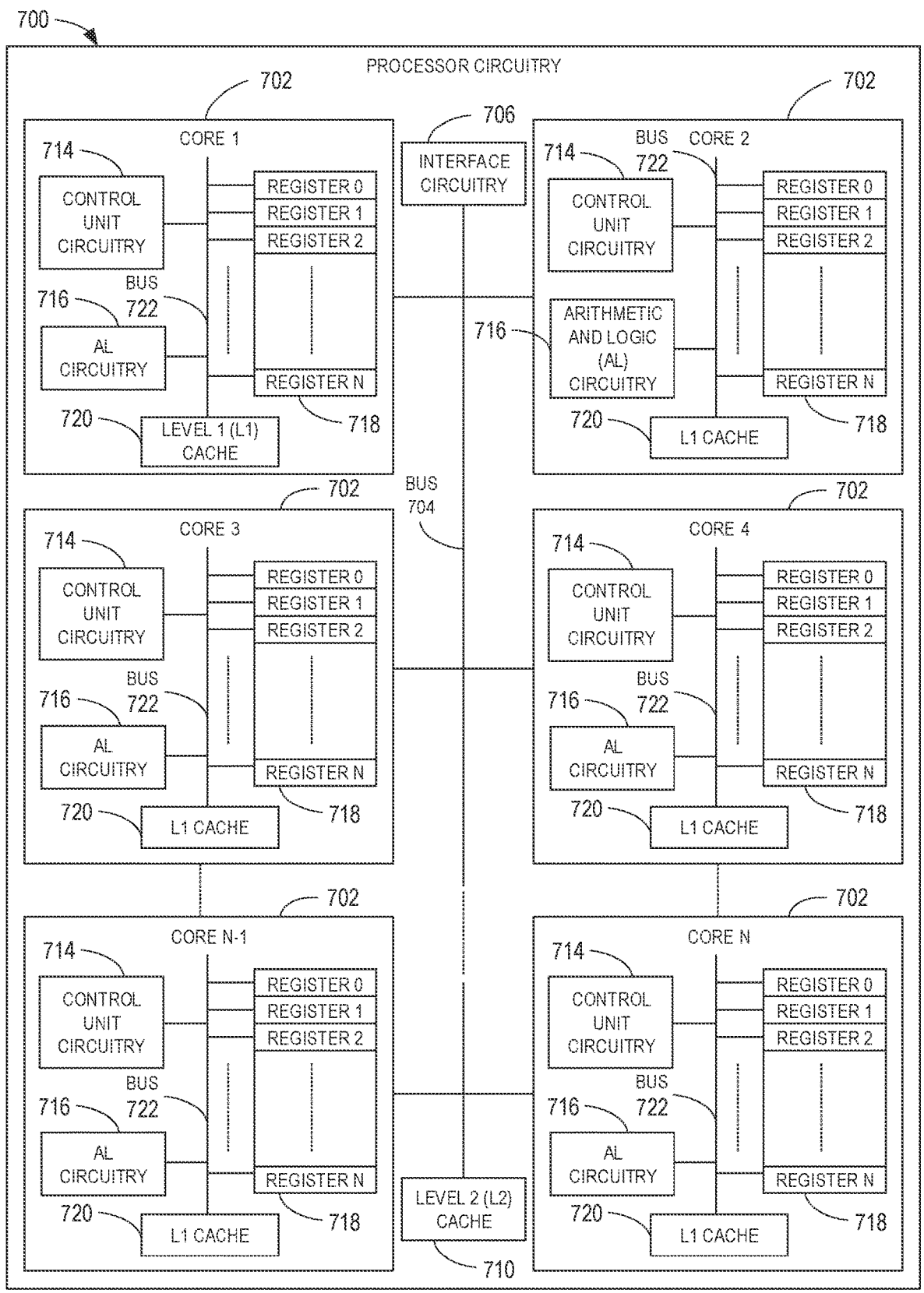
FIG. 7 is a block diagram of an example implementation of the processor circuitry of FIG. 6.

FIG. 7 is a block diagram of an example implementation of the processor circuitry 612 of FIG. 6. In this example, the processor circuitry 612 of FIG. 6 is implemented by a microprocessor 700. For example, the microprocessor _00 may implement multi-core hardware circuitry such as a CPU, a DSP, a GPU, an XPU, etc. Although it may include any number of example cores 702 (e.g., 1 core), the microprocessor 700 of this example is a multi-core semiconductor device including N cores. The cores 702 of the microprocessor 700 may operate independently or may cooperate to execute machine readable instructions. For example, machine code corresponding to a firmware program, an embedded software program, or a software program may be executed by one of the cores 702 or may be executed by multiple ones of the cores 702 at the same or different times. In some examples, the machine code corresponding to the firmware program, the embedded software program, or the software program is split into threads and executed in parallel by two or more of the cores 702. The software program may correspond to a portion or all of the machine readable instructions and/or operations represented by the flowchart of FIG. 5.

The cores 702 may communicate by an example bus 704. In some examples, the bus 704 may implement a communication bus to effectuate communication associated with one(s) of the cores 702. For example, the bus 704 may implement at least one of an Inter-Integrated Circuit (I2C) bus, a Serial Peripheral Interface (SPI) bus, a PCI bus, or a PCIe bus. Additionally or alternatively, the bus 704 may implement any other type of computing or electrical bus. The cores 702 may obtain data, instructions, and/or signals from one or more external devices by example interface circuitry 706. The cores 702 may output data, instructions, and/or signals to the one or more external devices by the interface circuitry 706. Although the cores 702 of this example include example local memory 720 (e.g., Level 1 (L1) cache that may be split into an L1 data cache and an L1 instruction cache), the microprocessor 700 also includes example shared memory 710 that may be shared by the cores (e.g., Level 2 (L2_cache)) for high-speed access to data and/or instructions. Data and/or instructions may be transferred (e.g., shared) by writing to and/or reading from the shared memory 710. The local memory 720 of each of the cores 702 and the shared memory 710 may be part of a hierarchy of storage devices including multiple levels of cache memory and the main memory (e.g., the main memory 614, 616 of FIG. 6). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 702 may be referred to as a CPU, DSP, GPU, etc., or any other type of hardware circuitry. Each core 702 includes control unit circuitry 714, arithmetic and logic (AL) circuitry (sometimes referred to as an ALU) 716, a plurality of registers 718, the L1 cache 720, and an example bus 722. Other structures may be present. For example, each core 702 may include vector unit circuitry, single instruction multiple data (SIMD) unit circuitry, load/store unit (LSU) circuitry, branch/jump unit circuitry, floating-point unit (FPU) circuitry, etc. The control unit circuitry 714 includes semiconductor-based circuits structured to control (e.g., coordinate) data movement within the corresponding core 702. The AL circuitry 716 includes semiconductor-based circuits structured to perform one or more mathematic and/or logic operations on the data within the corresponding core 702. The AL circuitry 716 of some examples performs integer based operations. In other examples, the AL circuitry 716 also performs floating point operations. In yet other examples, the AL circuitry 716 may include first AL circuitry that performs integer based operations and second AL circuitry that performs floating point operations. In some examples, the AL circuitry 716 may be referred to as an Arithmetic Logic Unit (ALU). The registers 718 are semiconductor-based structures to store data and/or instructions such as results of one or more of the operations performed by the AL circuitry 716 of the corresponding core 702. For example, the registers 718 may include vector register(s), SIMD register(s), general purpose register(s), flag register(s), segment register(s), machine specific register(s), instruction pointer register(s), control register(s), debug register(s), memory management register(s), machine check register(s), etc. The registers 718 may be arranged in a bank as shown in FIG. 7. Alternatively, the registers 718 may be organized in any other arrangement, format, or structure including distributed throughout the core 702 to shorten access time. The bus 722 may implement at least one of an I2C bus, a SPI bus, a PCI bus, or a PCIe bus Each core 702 and/or, more generally, the microprocessor 700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 8:
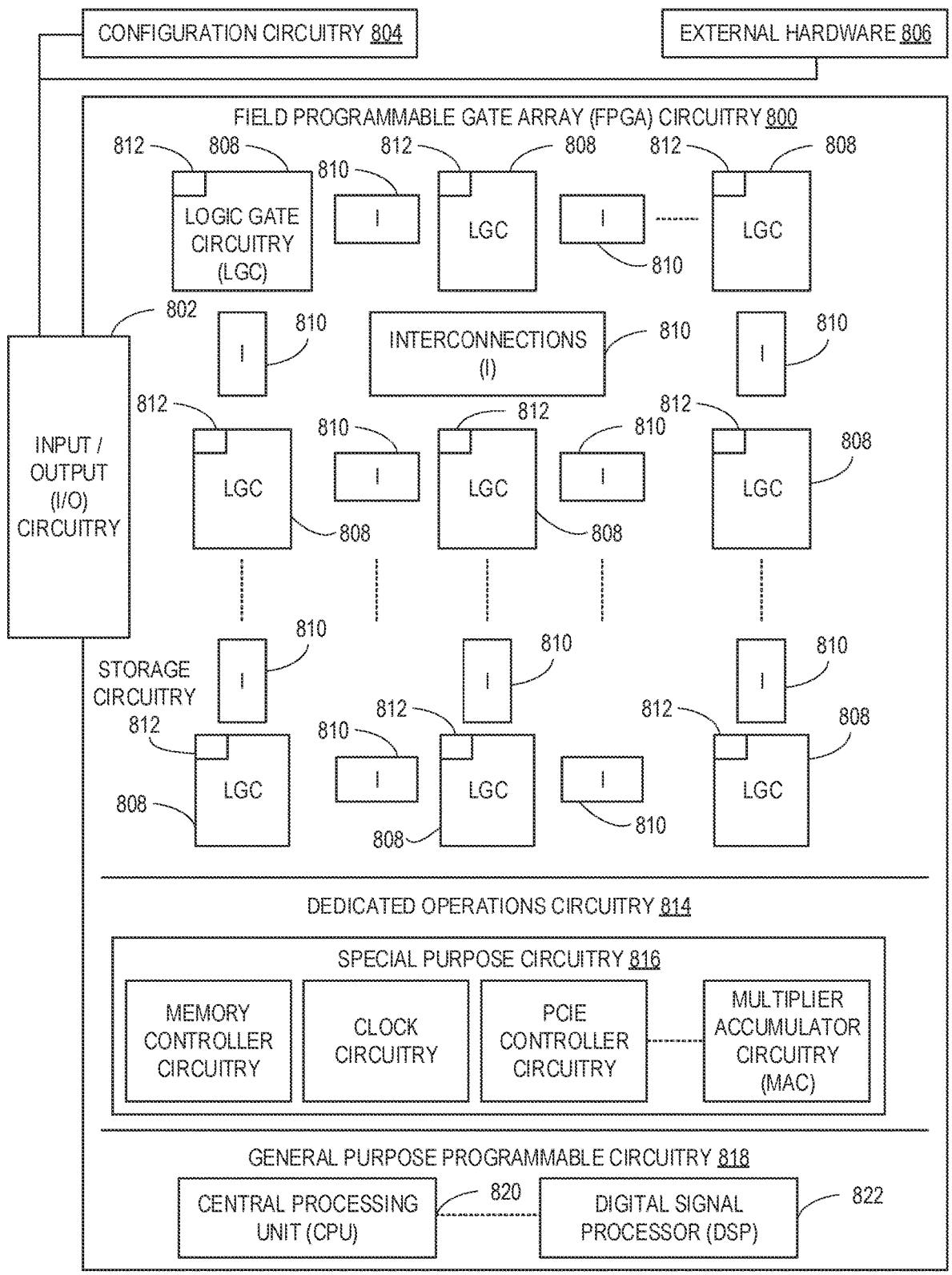
FIG. 8 is a block diagram of another example implementation of the processor circuitry of FIG. 6.

FIG. 8 is a block diagram of another example implementation of the processor circuitry 612 of FIG. 4. In this example, the processor circuitry 612 is implemented by FPGA circuitry 800. The FPGA circuitry 800 can be used, for example, to perform operations that could otherwise be performed by the example microprocessor 700 of FIG. 7 executing corresponding machine readable instructions. However, once configured, the FPGA circuitry 800 instantiates the machine readable instructions in hardware and, thus, can often execute the operations faster than they could be performed by a general purpose microprocessor executing the corresponding software.

More specifically, in contrast to the microprocessor 00 of FIG. 7 described above (which is a general purpose device that may be programmed to execute some or all of the machine readable instructions represented by the flowchart of FIG. 5 but whose interconnections and logic circuitry are fixed once fabricated), the FPGA circuitry 800 of the example of FIG. 8 includes interconnections and logic circuitry that may be configured and/or interconnected in different ways after fabrication to instantiate, for example, some or all of the machine readable instructions represented by the flowchart of FIG. 5. In particular, the FPGA 800 may be thought of as an array of logic gates, interconnections, and switches. The switches can be programmed to change how the logic gates are interconnected by the interconnections, effectively forming one or more dedicated logic circuits (unless and until the FPGA circuitry 800 is reprogrammed). The configured logic circuits enable the logic gates to cooperate in different ways to perform different operations on data received by input circuitry. Those operations may correspond to some or all of the software represented by the flowchart of FIG. 5. As such, the FPGA circuitry 800 may be structured to effectively instantiate some or all of the machine readable instructions of the flowchart of FIG. 5 as dedicated logic circuits to perform the operations corresponding to those software instructions in a dedicated manner analogous to an ASIC. Therefore, the FPGA circuitry 800 may perform the operations corresponding to the some or all of the machine readable instructions of FIG. 5 faster than the general purpose microprocessor can execute the same.

In the example of FIG. 8, the FPGA circuitry 800 is structured to be programmed (and/or reprogrammed one or more times) by an end user by a hardware description language (HDL) such as Verilog. The FPGA circuitry 800 of FIG. 8, includes example input/output (I/O) circuitry 802 to obtain and/or output data to/from example configuration circuitry 804 and/or external hardware (e.g., external hardware circuitry) 806. For example, the configuration circuitry 804 may implement interface circuitry that may obtain machine readable instructions to configure the FPGA circuitry 800, or portion(s) thereof. In some such examples, the configuration circuitry 804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 806 may implement the microprocessor 700 of FIG. 7. The FPGA circuitry 800 also includes an array of example logic gate circuitry 808, a plurality of example configurable interconnections 810, and example storage circuitry 812. The logic gate circuitry 808 and interconnections 810 are configurable to instantiate one or more operations that may correspond to at least some of the machine readable instructions of FIG. 5 and/or other desired operations. The logic gate circuitry 808 shown in FIG. 6 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 808 to enable configuration of the electrical structures and/or the logic gates to form circuits to perform desired operations. The logic gate circuitry 808 may include other electrical structures such as look-up tables (LUTs), registers (e.g., flip-flops or latches), multiplexers, etc.

The interconnections 810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 808 to program desired logic circuits.

The storage circuitry 812 of the illustrated example is structured to store result(s) of the one or more of the operations performed by corresponding logic gates. The storage circuitry 812 may be implemented by registers or the like. In the illustrated example, the storage circuitry 812 is distributed amongst the logic gate circuitry 808 to facilitate access and increase execution speed.

The example FPGA circuitry 800 of FIG. 8 also includes example Dedicated Operations Circuitry 814. In this example, the Dedicated Operations Circuitry 814 includes special purpose circuitry 816 that may be invoked to implement commonly used functions to avoid the need to program those functions in the field. Examples of such special purpose circuitry 816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 800 may also include example general purpose programmable circuitry 818 such as an example CPU 820 and/or an example DSP 822. Other general purpose programmable circuitry 818 may additionally or alternatively be present such as a GPU, an XPU, etc., that can be programmed to perform other operations.

Although FIGS. 7 and 8 illustrate two example implementations of the processor circuitry 612 of FIG. 6, many other approaches are contemplated. For example, as mentioned above, modern FPGA circuitry may include an onboard CPU, such as one or more of the example CPU 820 of FIG. 8. Therefore, the processor circuitry 612 of FIG. 6 may additionally be implemented by combining the example microprocessor 700 of FIG. 7 and the example FPGA circuitry 800 of FIG. 8. In some such hybrid examples, a first portion of the machine readable instructions represented by the flowchart of FIG. 5 may be executed by one or more of the cores 702 of FIG. 7 and a second portion of the machine readable instructions represented by the flowchart of FIG. 5 may be executed by the FPGA circuitry 800 of FIG. 8.

In some examples, the processor circuitry 612 of FIG. 6 may be in one or more packages. For example, the processor circuitry 700 of FIG. 7 and/or the FPGA circuitry 800 of FIG. 8 may be in one or more packages. In some examples, an XPU may be implemented by the processor circuitry 612 of FIG. 6, which may be in one or more packages. For example, the XPU may include a CPU in one package, a DSP in another package, a GPU in yet another package, and an FPGA in still yet another package.

Example methods, apparatus, systems, and articles of manufacture to correct for steering wheel rotation are disclosed herein. Further examples and combinations thereof include the following:

Example 1 includes a vehicle comprising a steering assist system, a steering wheel, a user interface, and a steering controller to detect, via the user interface, a request to move the steering wheel of a vehicle to a first rotational position, the steering wheel having a second rotational position, determine, based on the first rotational position and a first parameter, a third rotational position having a first offset from the second rotational position, actuate, via the steering assist system, the steering wheel to the third rotational position, disengage the steering assist system, the disengagement causing the steering wheel to rotate to a fourth rotational position, and compare the first rotational position to the fourth rotational position to determine if the request has been satisfied.

Example 2 includes the vehicle of example 1, wherein the first parameter includes at least one of a motor torque of the steering assist system, an electric current of the steering assist system, a steering torque, or a pinion angle.

Example 3 includes the vehicle of example 1, further including a suspension system, and a steering rack, the first offset compensating for residual forces associated with at least of a position of the steering rack or a position of the suspension system.

Example 4 includes the vehicle of example 1, wherein the steering assist system is an electric power steering system and the steering controller is to actuate the steering wheel to the third rotational position by changing a position of an actuator of the electric power steering system.

Example 5 includes the vehicle of example 4, wherein the steering controller is to disengage the steering assist system by disengaging the actuator.

Example 6 includes the vehicle of example 1, wherein the first rotational position is a centered position and further including, in response to determining a difference between first rotational position and the fourth rotational position satisfies a threshold, stowing the steering wheel.

Example 7 includes the vehicle of example 1, wherein the steering controller is further to, in response to determining a difference between first rotational position and the fourth rotational position not satisfying a threshold reengage the steering assist system, determine, based the fourth rotational position and a second parameter, a fifth rotational position having a second offset from the second rotational position, and actuate, via the steering assist system, the steering wheel to the fifth rotational position, and disengage the steering assist system.

Example 8 includes a method comprising detecting a request to move a steering wheel of a vehicle to a first rotational position, the steering wheel having a second rotational position, determining, based the first rotational position and a first parameter, a third rotational position having a first offset from the second rotational position, actuating, via a steering assist system, the steering wheel to the third rotational position, disengaging the steering assist system, the disengagement causing the steering wheel to rotate to a fourth rotational position, and comparing the first rotational position to the fourth rotational position to determine if the request has been satisfied.

Example 9 includes the method of example 8, wherein the first parameter includes at least one of a motor torque of the steering assist system, an electric current of the steering assist system, a steering torque, or a pinion angle.

Example 10 includes the method of example 8, wherein the first offset compensates for residual forces associated with at least of a position of a steering rack or a position of a suspension system.

Example 11 includes the method of example 8, wherein the steering assist system is an electric power steering system and actuating the steering wheel to the third rotational position includes changing a position of an actuator of the electric power steering system disposed on at least one of a steering column or a steering rack.

Example 12 includes the method of example 11, wherein disengaging the steering assist system includes disengaging the actuator from the at least one of the steering column of the steering rack.

Example 13 includes the method of example 8, wherein the first rotational position is a centered position and further including, in response to determining a difference between first rotational position and the fourth rotational position satisfies a threshold, stowing the steering wheel.

Example 14 includes a non-transitory computer readable medium comprising instructions which, when executed, cause a processor to at least detect a request to move a steering wheel of a vehicle to a first rotational position, the steering wheel having a second rotational position, determine, based the first rotational position and a first parameter, a third rotational position having a first offset from the second rotational position, actuate, via a steering assist system, the steering wheel to the third rotational position, disengage the steering assist system, the disengagement causing the steering wheel to rotate to a fourth rotational position, and compare the first rotational position to the fourth rotational position to determine if the request has been satisfied.

Example 15 includes the non-transitory computer readable medium of example 14, wherein the first parameter includes at least one of a motor torque of the steering assist system, an electric current of the steering assist system, a steering torque, or a pinion angle.

Example 16 includes the non-transitory computer readable medium of example 14, wherein the first offset compensates for residual forces associated with at least of a position of a steering rack or a position of a suspension system.

Example 17 includes the non-transitory computer readable medium of example 14, wherein the steering assist system is an electric power steering system and wherein the instructions, when executed, cause the processor to actuate the steering wheel to the third rotational position by changing a position of an actuator of the electric power steering system disposed on at least one of a steering column or a steering rack.

Example 18 includes the non-transitory computer readable medium of example 17, wherein the instructions, when executed, cause the processor to disengage the steering assist system by disengaging the actuator from the at least one of the steering column or the steering rack.

Example 19 includes the non-transitory computer readable medium of example 14, wherein the first rotational position is a centered position and wherein the instructions, when executed, cause the processor to stow the steering wheel in response to determining a difference between the first rotational position and the fourth rotational position satisfies a threshold.

Example 20 includes the non-transitory computer readable medium of example 14, wherein the instructions, when executed, cause the processor to. in response to determining a difference between the first rotational position and the fourth rotational position not satisfying a threshold reengage the steering assist system, determine, based the fourth rotational position and a second parameter, a fifth rotational position having a second offset from the second rotational position, and actuate, via a steering assist system, the steering wheel to the fifth rotational position, and disengage the steering assist system. Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A vehicle comprising:
a steering assist system;
a steering wheel;
a steering column coupled to the steering wheel;
a user interface; and
a steering controller to:
 detect, via the user interface, a request to move the steering wheel to a first rotational position, the steering wheel having a second rotational position;
 determine, based on the first rotational position and a first parameter, a third rotational position having a first offset from the second rotational position, the first offset compensating for residual spring forces acting on the steering column;
 actuate, via the steering assist system, the steering wheel to the third rotational position;
 disengage the steering assist system, the disengagement causing the steering wheel to rotate to a fourth rotational position; and
 compare the first rotational position to the fourth rotational position to determine if the request has been satisfied.

2. The vehicle of claim 1, wherein the first parameter includes at least one of a motor torque of the steering assist system, an electric current of the steering assist system, a steering torque, or a pinion angle.

3. The vehicle of claim 1, further including:
a suspension system; and
a steering rack, the residual spring forces associated with at least one of a position of the steering rack or a position of the suspension system.

4. The vehicle of claim 1, wherein the steering assist system is an electric power steering system and the steering controller is to actuate the steering wheel to the third rotational position by changing a position of an actuator of the electric power steering system.

5. The vehicle of claim 4, wherein the steering controller is to disengage the steering assist system by disengaging the actuator.

6. The vehicle of claim 1, wherein the first rotational position is a centered position and further including, in response to determining a difference between the first rotational position and the fourth rotational position satisfies a threshold, stowing the steering wheel.

7. The vehicle of claim 1, wherein the steering controller is further to, in response to determining a difference between the first rotational position and the fourth rotational position not satisfying a threshold:
reengage the steering assist system;
determine, based the fourth rotational position and a second parameter, a fifth rotational position having a second offset from the second rotational position; and
actuate, via the steering assist system, the steering wheel to the fifth rotational position; and
disengage the steering assist system.

8. A method comprising:
detecting a request to move a steering wheel of a vehicle to a first rotational position, the steering wheel having a second rotational position;
determining, based on the first rotational position and a first parameter, a third rotational position having a first offset from the second rotational position, the first offset compensating for residual spring forces acting on a steering column coupled to the steering wheel;
actuating, via a steering assist system, the steering wheel to the third rotational position;
disengaging the steering assist system, the disengagement causing the steering wheel to rotate to a fourth rotational position; and
comparing the first rotational position to the fourth rotational position to determine if the request has been satisfied.

9. The method of claim 8, wherein the first parameter includes at least one of a motor torque of the steering assist system, an electric current of the steering assist system, a steering torque, or a pinion angle.

10. The method of claim 8, wherein the residual spring forces are associated with at least one of a position of a steering rack or a position of a suspension system.

11. The method of claim 8, wherein the steering assist system is an electric power steering system and actuating the steering wheel to the third rotational position includes changing a position of an actuator of the electric power steering system disposed on at least one of the steering column or a steering rack.

12. The method of claim 11, wherein disengaging the steering assist system includes disengaging the actuator from the at least one of the steering column of the steering rack.

13. The method of claim 8, wherein the first rotational position is a centered position and further including, in response to determining a difference between the first rotational position and the fourth rotational position satisfies a threshold, stowing the steering wheel.

14. A non-transitory computer readable medium comprising instructions which, when executed, cause a processor to at least:
detect a request to move a steering wheel of a vehicle to a first rotational position, the steering wheel having a second rotational position;
determine, based on the first rotational position and a first parameter, a third rotational position having a first offset from the second rotational position, the first offset compensating for residual spring forces acting on a steering column coupled to the steering wheel;
actuate, via a steering assist system, the steering wheel to the third rotational position;
disengage the steering assist system, the disengagement causing the steering wheel to rotate to a fourth rotational position; and
compare the first rotational position to the fourth rotational position to determine if the request has been satisfied.

15. The non-transitory computer readable medium of claim 14, wherein the first parameter includes at least one of a motor torque of the steering assist system, an electric current of the steering assist system, a steering torque, or a pinion angle.

16. The non-transitory computer readable medium of claim 14, wherein the residual spring forces are associated with at least of a position of a steering rack or a position of a suspension system.

17. The non-transitory computer readable medium of claim 14, wherein the steering assist system is an electric power steering system and wherein the instructions, when executed, cause the processor to actuate the steering wheel to the third rotational position by changing a position of an actuator of the electric power steering system disposed on at least one of the steering column or a steering rack.

18. The non-transitory computer readable medium of claim 17, wherein the instructions, when executed, cause the processor to disengage the steering assist system by disengaging the actuator from the at least one of the steering column or the steering rack.

19. The non-transitory computer readable medium of claim 14, wherein the first rotational position is a centered position and wherein the instructions, when executed, cause the processor to stow the steering wheel in response to determining a difference between the first rotational position and the fourth rotational position satisfies a threshold.

20. The non-transitory computer readable medium of claim 14, wherein the instructions, when executed, cause the processor to. in response to determining a difference between the first rotational position and the fourth rotational position not satisfying a threshold:
    reengage the steering assist system;
    determine, based the fourth rotational position and a second parameter, a fifth rotational position having a second offset from the second rotational position; and
    actuate, via a steering assist system, the steering wheel to the fifth rotational position; and
    disengage the steering assist system.

21. The vehicle of claim 1, further including a sensor and wherein the steering controller determines the third rotational position via a look-up table and an output of the sensor.

* * * * *